United States Patent
Prest et al.

(10) Patent No.: US 11,230,333 B2
(45) Date of Patent: Jan. 25, 2022

(54) WEBBED IDLER WHEEL ASSEMBLY FOR TRACKED MACHINES

(71) Applicant: Caterpillar Inc., Deerfield, IL (US)

(72) Inventors: Paul Prest, Peoria, IL (US); Benjamin I. Jones, Bartonville, IL (US)

(73) Assignee: Caterpillar Inc., Peoria, IL (US)

( * ) Notice: Subject to any disclaimer, the term of this patent is extended or adjusted under 35 U.S.C. 154(b) by 484 days.

(21) Appl. No.: 16/204,552

(22) Filed: Nov. 29, 2018

(65) Prior Publication Data

US 2020/0172181 A1    Jun. 4, 2020

(51) Int. Cl.
  *B62D 55/14*    (2006.01)
  *B21K 1/28*    (2006.01)

(52) U.S. Cl.
  CPC ............. *B62D 55/14* (2013.01); *B21K 1/28* (2013.01)

(58) Field of Classification Search
  CPC ......... B62D 55/14; B62D 55/145; B21K 1/28
  See application file for complete search history.

(56) References Cited

U.S. PATENT DOCUMENTS

| | | | |
|---|---|---|---|
| 2,355,941 A * | 8/1944 | Ash | B62D 55/14 301/64.303 |
| 3,842,475 A | 10/1974 | Clasper et al. | |
| 3,958,837 A | 5/1976 | Chagawa | |
| 3,993,356 A | 11/1976 | Groff | |
| 6,129,426 A * | 10/2000 | Tucker | B62D 55/065 305/136 |
| 8,770,676 B2 | 7/2014 | Yelistratov | |
| 8,770,677 B2 | 7/2014 | Yelistratov | |
| 9,180,921 B2 | 11/2015 | Joseph Xavier et al. | |
| 9,387,893 B2 * | 7/2016 | Steiner | B62D 55/32 |
| 2010/0102623 A1 * | 4/2010 | Mulligan | B62D 55/145 305/137 |
| 2014/0001823 A1 | 1/2014 | Meyer et al. | |
| 2014/0091615 A1 * | 4/2014 | Knobloch | B62D 55/0966 305/136 |
| 2015/0081166 A1 * | 3/2015 | Diekevers | B62D 55/14 701/34.4 |
| 2016/0096564 A1 * | 4/2016 | Steiner | B62D 55/14 305/15 |
| 2017/0057572 A1 | 3/2017 | Hakes et al. | |
| 2018/0141104 A1 | 5/2018 | Pan | |

FOREIGN PATENT DOCUMENTS

| | | | |
|---|---|---|---|
| CN | 104354776 | | 2/2015 |
| CN | 108163073 A | * | 6/2018 |
| CN | 106218744 | | 9/2018 |
| EP | 3002180 | | 4/2016 |
| KR | 20020001316 | | 1/2002 |

* cited by examiner

*Primary Examiner* — Kip T Kotter
(74) *Attorney, Agent, or Firm* — Schwegman, Lundberg & Woessner

(57) ABSTRACT

An idler wheel for a tracked machine can comprise a cylindrical hub defining a central axis, an annular tread disposed concentrically about the cylindrical hub, a pair of side plates connecting the cylindrical hub and the annular tread, and a webbing connecting the cylindrical hub and the annular tread between the pair of side plates. A method for manufacturing an idler wheel comprises assembling a cylindrical hub, an annular tread, first and second side plates and at least one web.

14 Claims, 7 Drawing Sheets

WEBBED IDLER WHEEL ASSEMBLY FOR TRACKED MACHINES

TECHNICAL FIELD

The present application relates generally, but not by way of limitation, to idler wheels for tracked machines that can be used in various applications, such as industrial, paving, agricultural, construction and earth-moving operations. More particularly, the present application relates to fabricated idler wheel assemblies and methods for manufacturing idler wheels.

BACKGROUND

Machines incorporating track-type treads used in mining, construction, agriculture, and the like are supported on an undercarriage assembly that can have one or more continuous track-type treads or "continuous tracks" that enable the machine to traverse the ground or terrain. The continuous track can include a plurality of track links that are pivotally joined or linked together by pins, for example, and that are arranged in a continuous loop or belt similar to a closed chain. The continuous track can also include track shoes or track pads disposed thereon to engage the ground. The continuous track is disposed around a plurality of wheels, idlers and/or rollers arranged along a lower side of the machine and the track can be made to translate about the wheels or rollers with respect to the machine by a drive sprocket operatively coupled to a prime mover. The hinged connection between the individual track links enables the continuous track to articulate, e.g., flex or bend, as it moves in a loop about the plurality of rollers and thereby bringing the track shoes into engagement with the ground.

An advantage of continuous tracks is that they can better support and distribute the weight of the machine due to the fact the continuous track provides more surface contact with the ground and thus better traction, as compared with other forms of propulsion such as pneumatic tires or wheels. Accordingly, continuous tracks can better traverse soft or loose soil or other materials without becoming stuck or spinning. In addition, the improved traction can facilitate climbing capability or the ability to drive along steep grades in the work surface. Further, because the individual track shoes and links are often made of steel, continuous tracks are typically more durable than pneumatic tires or the like.

It can be important to maintain alignment of the continuous track around the wheels, idlers and/or rollers to facilitate movement of the vehicle without overly stressing or breaking components of the continuous track. Idler wheels, in particular, must simultaneously facilitate alignment of the continuous track and rolling of the machine, while supporting the weight of the machine. As such, for large tracked machines, such as mining excavators, idler wheels can comprise very large and heavy components.

Publication No. US 2014/0001823 A1 to Meyer et al., entitled "Dual Disk Idler for a Machine Undercarriage," and Publication No. KR 2002-0001316 A to Soon, entitled "Front Idler for Lower Driving Apparatus for Heavy Construction Equipment," disclose tracked-machine idler wheels.

SUMMARY OF THE INVENTION

An idler wheel for a tracked machine can comprise a cylindrical hub defining a central axis, an annular tread disposed concentrically about the cylindrical hub, a pair of side plates connecting the cylindrical hub and the annular tread, and a webbing connecting the cylindrical hub and the annular tread between the pair of side plates.

A method for manufacturing an idler wheel can comprise positioning a cylindrical hub to have access to axial ends of the cylindrical hub, positioning an annular tread concentrically about the cylindrical hub, positioning a first annular web radially between the cylindrical hub and the annular tread, positioning a first annular side plate between the cylindrical hub and the annular tread at a first side of the cylindrical hub outside of the first annular web, and positioning a second annular side plate between the cylindrical hub and the annular tread at a second side of the cylindrical hub outside of the first annular web.

A double-webbed idler wheel for a vehicle track system can comprise an inner diameter hub comprising first axially spaced apart side faces defining a first axial width and a first shoulder extending radially outward from between the first axially spaced apart side faces, an outer diameter tread concentrically disposed about the inner diameter hub comprising second axially spaced apart side faces defining a second axial width and a guide flange extending radially outward from between the second axially spaced apart side faces, a first pair of webs extending from the inner diameter hub to the outer diameter tread, and a second pair of webs extending from the inner diameter hub radially aligned with the first shoulder to the outer diameter tread radially aligned with the guide flange.

DETAILED DESCRIPTION

Figure 1:
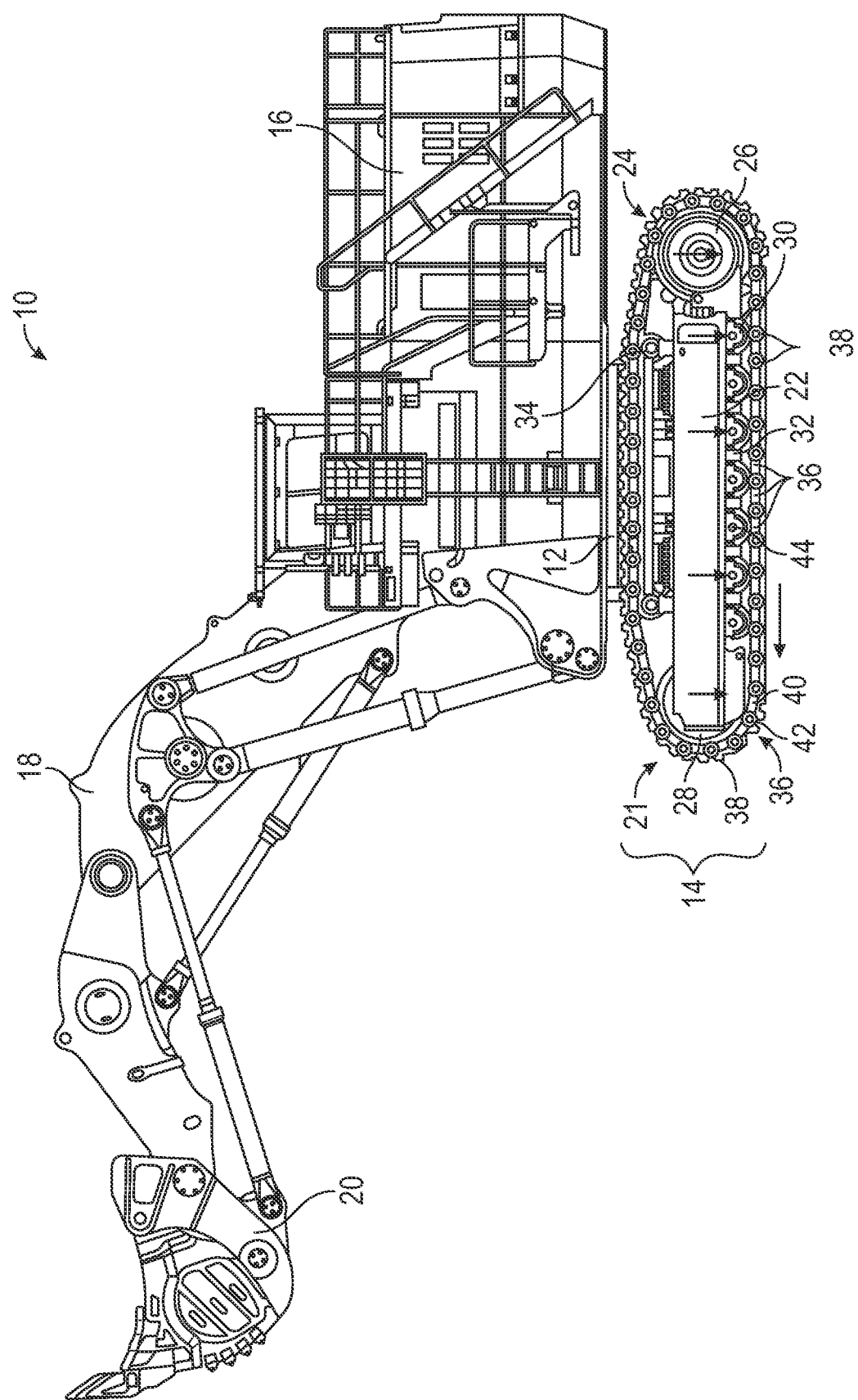
FIG. 1 is a schematic side view of a machine comprising a chassis having an undercarriage system with a track system according to the present disclosure.

FIG. 1 is a schematic side view of machine 10 comprising chassis 12 having undercarriage system 14 according to the present disclosure. Machine 10 may be any type of machine that includes a tracked undercarriage system. In the example shown in FIG. 1, machine 10 is an excavator comprising superstructure 16 pivotally supported from chassis 12. In this embodiment, machine 10 can include implement 18, which may have excavating bucket 20 attached thereto for digging. Machine 10 may alternatively be another type of machine, including, but not limited to, a track-type tractor.

Undercarriage 14 may be configured to support machine 10 from and move along the ground, roads, and/or other types of terrain. Undercarriage 14 can comprise track system 21 comprising track roller frame 22, various guiding components connected to track roller frame 22, and endless track 24 engaging the guiding components. The guiding components of undercarriage 14 can comprise drive sprocket 26, idler 28, rollers 30, track guide 32 and carrier 34.

Track 24 can comprise link assemblies 36 that can form a flexible backbone of track 24. Link assemblies 36 can comprise a plurality of track shoes 38 joined by a plurality of links 40 connected to one another at pivot joints 42. In FIG. 1, only half of links 40 can be seen. For each link 40 visible in FIG. 1, each link assembly 36 can include a corresponding laterally spaced link 40 (located further into the plane of FIG. 1). Link assemblies 36 can extend in an endless chain around drive sprocket 26, rollers 30, idler 28, and carrier 34. Track shoes 38 can be located at the perimeter of link assemblies 36. For example, track 24 can include shoes 38 attached to, or integral with, the outside surface of each laterally spaced pair of links 40.

Rollers 30 and track guide 32 can guide the lower portion of track 24. Rollers 30 can each be suspended beneath track roller frame 22. For example, rollers 30 can be rotationally supported on axles 44 coupled to track roller frame 22. The undersides of rollers 30 can ride on and guide links 40 in the lower portion of the endless chain formed by link assemblies 36. Track guide 32 can also be suspended from track roller frame 22. Track guide 32 can extend adjacent sides of links 40 in the lower portion of the endless chain formed by link assemblies 36, thereby further guiding this portion of link assemblies 36.

Figure 2:
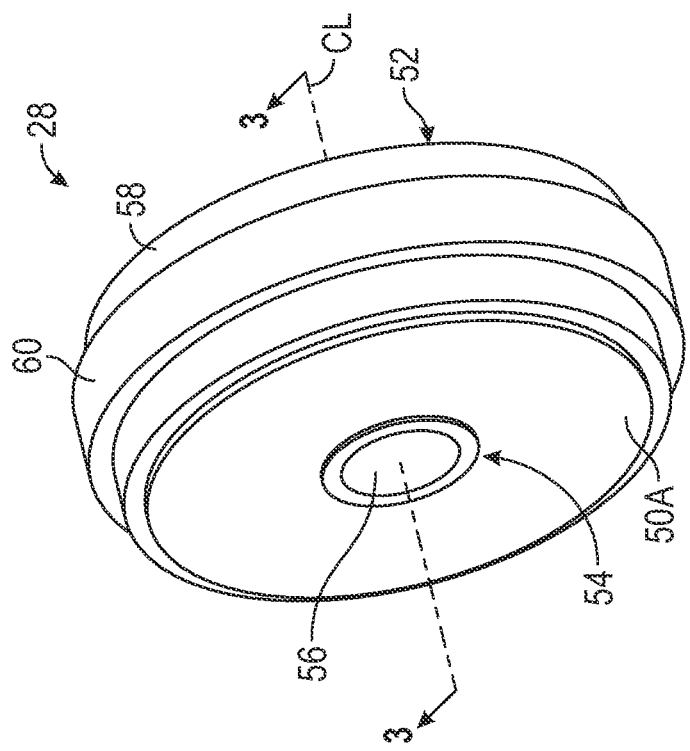
FIG. 2 is perspective view of an idler wheel for use with the track system of FIG. 1 showing a side plate extending between a tread and a hub.

Carrier 34 can guide the upper portion of track 24, such as by extending upward from track roller frame 22 and engaging a portion of link assemblies 36 in an upper portion of its endless chain. Carrier 34 can have various configurations. As shown in FIG. 2, in the illustrated embodiment, carrier 34 can comprise a skid on which link assemblies 36 ride. In addition to or instead of skids, carrier 34 can include rollers on which link assemblies 36 ride.

Drive sprocket 26 and idler 28 can guide the end portions of the loop of track 24. Drive sprocket 26 and idler 28 can be suspended from opposite ends of track roller frame 22. The ends of the loop formed by link assemblies 36 can wrap around drive sprocket 26 and idler 28. One or more portions of drive sprocket 26 can project into spaces between laterally spaced pairs of links 40. One or more portions of idler 28 may also project into spaces between laterally spaced pairs of links 40. Drive sprocket 26 and idler 28 can rotate about lateral axes to guide the ends of link assemblies 36 through approximately semicircular paths between the lower and upper portions of the endless chain formed by the link assemblies 36. Additionally, because they extend into spaces between laterally spaced pairs of links 40, sprocket 26 and idler 28 can guide link assemblies 36 in lateral directions. Sprocket 26 can be rotated by an external power source (e.g., a prime mover within superstructure 16 not shown) to move one end of link assemblies 36 between the top and bottom stretches. Driven by sprocket 26, link assemblies 36 can, in turn, rotate idler 28 and rollers 30 around their rotation axes. Drive sprocket 26 can be located adjacent the ground at a height approximately the same as idler 28. Alternatively, in some embodiments, drive sprocket 26 may be elevated significantly above the ground at a height significantly higher than idler 28. For example, drive sprocket 26 may be positioned above track roller frame 22.

Track guide 32 and track guide 34 may help guide the end of track 24 adjacent idler 28. If track 24 should separate from rollers 30, track guide 34 can help guide track 24 back into proper engagement with rollers 30. Track guide 34 can extend down beside link assemblies 36 adjacent idler 28. Track guide 34 can extend from track roller frame 22 adjacent a side of links 40 as they extend around idler 28. Thus, track guide 34 can help keep link assemblies 36 properly aligned laterally as they extend around idler 28.

In order to support the weight of machine 10, as well as the side-to-side forces applied by maneuvering of machine 10, idler 28 can comprise a very rugged component. For example, for certain machines used as mining excavators, the size of idler 28 can be on the order of 2 meters (~6.5 feet) in diameter. As such, casting or forging of such components from a single piece of solid material can result in each idler weighing up to 3,400 kilograms (~3.75 tons). The present disclosure relates to fabricated idler wheel designs that can incorporate a double-web construction that provides a strong, durable and lightweight component that can replicate the performance of heavy, single-piece and solid idler wheels.

FIG. 2 is perspective view of idler 28 for use with track system 21 of FIG. 1 showing side plate 50A extending between tread 52 and hub 54. Idler 28 can be configured for rotation about center line CL, which forms a center axis. Hub 54 can comprise cylindrical sleeve 56 that is concentrically disposed about center line CL. Cylindrical sleeve 56 can be mounted to undercarriage 14, such as on an axle, spindle or pin. Tread 52 can comprise ring 58 and flange 60. Tread 52 can be configured to engage the underside of track 24. For example, ring 58 can roll against interior running surfaces of links 40, while flange 60 can extend into space between running surfaces. In an embodiment, links 40 can be configured according to the systems and methods described in U.S. Pub. No. 2017/0057572 to Hakes et al., entitled "Track Joint Assembly," the contents of which are hereby incorporated in their entirety by this reference.

Side plate 50A can comprise an annular disk that connects tread 52 and hub 54. Idler 28 can include side plate 50B (FIG. 3) spaced from side plate 50A along sleeve 56. Side plates 50A and 50B can be configured to support loading from machine 10 and track 24 applied to tread 52. In order to further increase the load bearing capabilities of idler 28, one or more idler webs, such as idler webs 62A and 62B of FIGS. 3 and 4 can be provided between side plates 50A and 50B.

Figure 3:
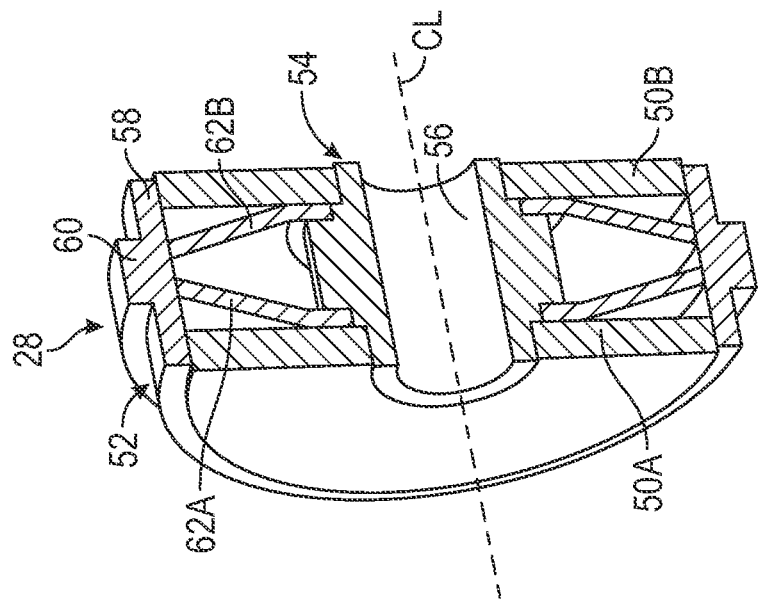
FIG. 3 is a cross-sectional view of the idler wheel of FIG. 2 showing first and second side plates between which are disposed first and second idler webs.
Figure 4:
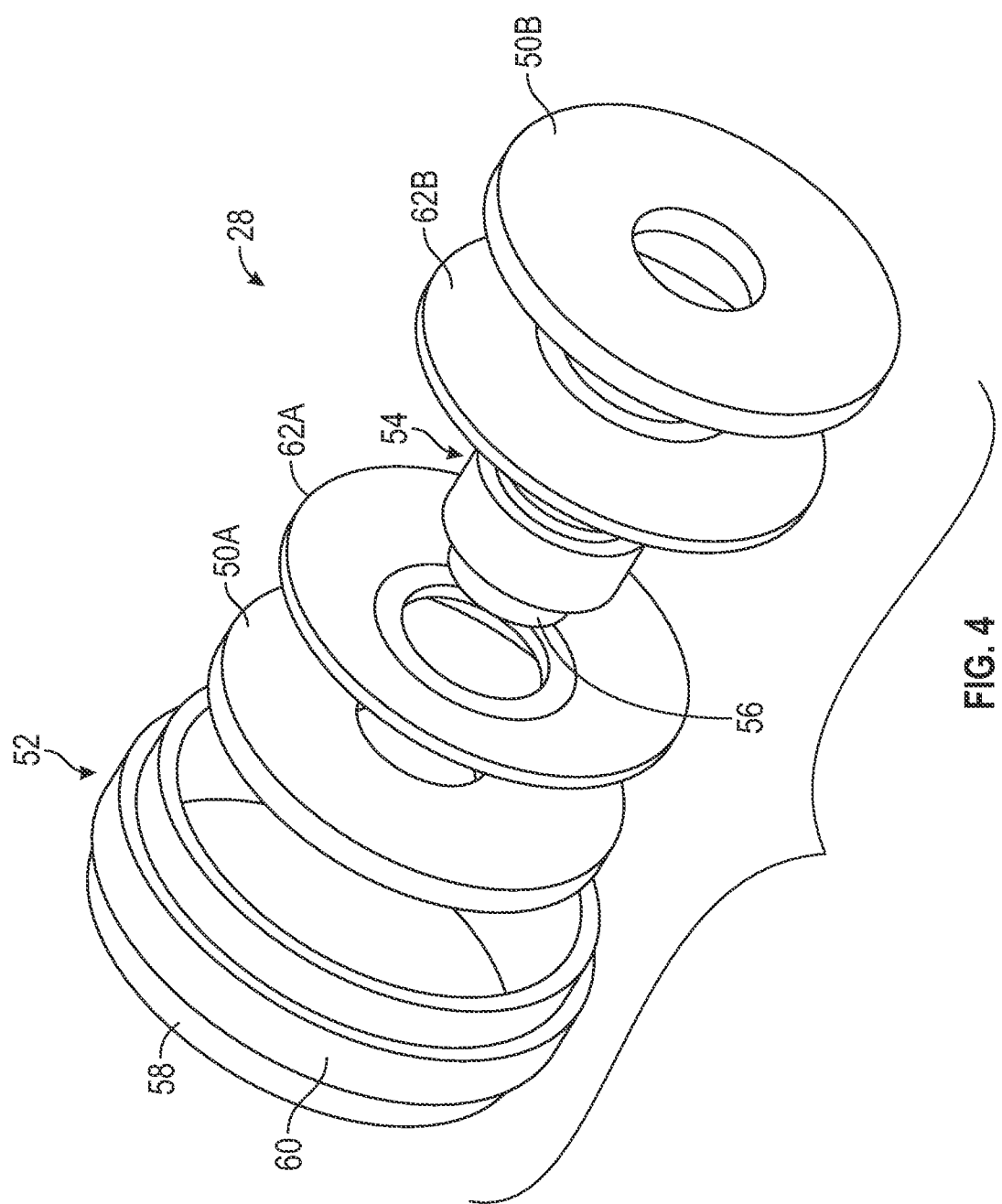
FIG. 4 is an exploded perspective view of the idler wheel of FIG. 2 showing the hub, the tread, first and second side plates and first and second idler webs.

FIG. 3 is a cross-sectional view of idler 28 of FIG. 2 showing first side plate 50A and second side plate 50B between which are disposed first idler web 62A and second idler web 62B. FIG. 4 is an exploded perspective view of idler 28 of FIG. 2 showing hub 54, tread 52, first side plate 50A, second side plate 50B, first idler web 62A and second idler web 62B. FIGS. 3 and 4 are discussed concurrently.

Side plates 50A and 50B can be used to directly connect hub 54 and tread 52. Likewise, idler webs 62A and 62B can be used to directly connect hub 54 and tread 52. In an embodiment, side plates 50A and 50B are connected at or near the axial extents of both hub 54 and tread 52. As shown, side plates 50A and 50B extend generally straight in the radial direction relative to center line $C_L$ to, for example, bear directly against radially loading from tread 52. In an embodiment, idler webs 62A and 62B are connected at an axially middle or interior portion of both hub 54 and tread 52. As shown, idler webs 62A and 62B extend, at least partially, in oblique directions relative to center line $C_L$ to, for example, bear against axial or side-to-side loading from tread 52 and to support flange 60 on ring 58. Side plates 50A and 50B can define a second pair of webs such that idler 28 can have a double-web construction.

Idler 28 can thus be fabricated from a plurality of individual components rather than being a single casting or forging. The fabrication of idler 28 can reduce the weight of the component as compared to forged or cast components. Additionally, cast or forged idler wheels require foundries for manufacturing and additional special heat treatment processes. The foundries must be capable of producing such a large component and performing the heat treatment processes. As such, the number of locations at which large idler wheels, such as those used on mining excavators, can be produced is limited. With the fabricated assembly described herein, the individual pieces of the double-web idler wheels can be manufactured with widely available processes such that special foundries are not needed, thereby increasing the number of locations where the idler wheels can be manufactured.

Although discussed herein with reference to idler 28 incorporating a dual-web construction including idler webs 62A and 62B, fewer or more webs or webbings can be used. For example, a single web could be positioned to extend centrally from hub 54 to beneath flange 60. A drawback of previous fabricated idler wheel designs is that the roll path area, such as directly inward of flange 60, can be unsupported. As such, the present application contemplates one or more webbings located between side plates 50A and 50B to support tread 52, such as at flange 60.

Figure 5:
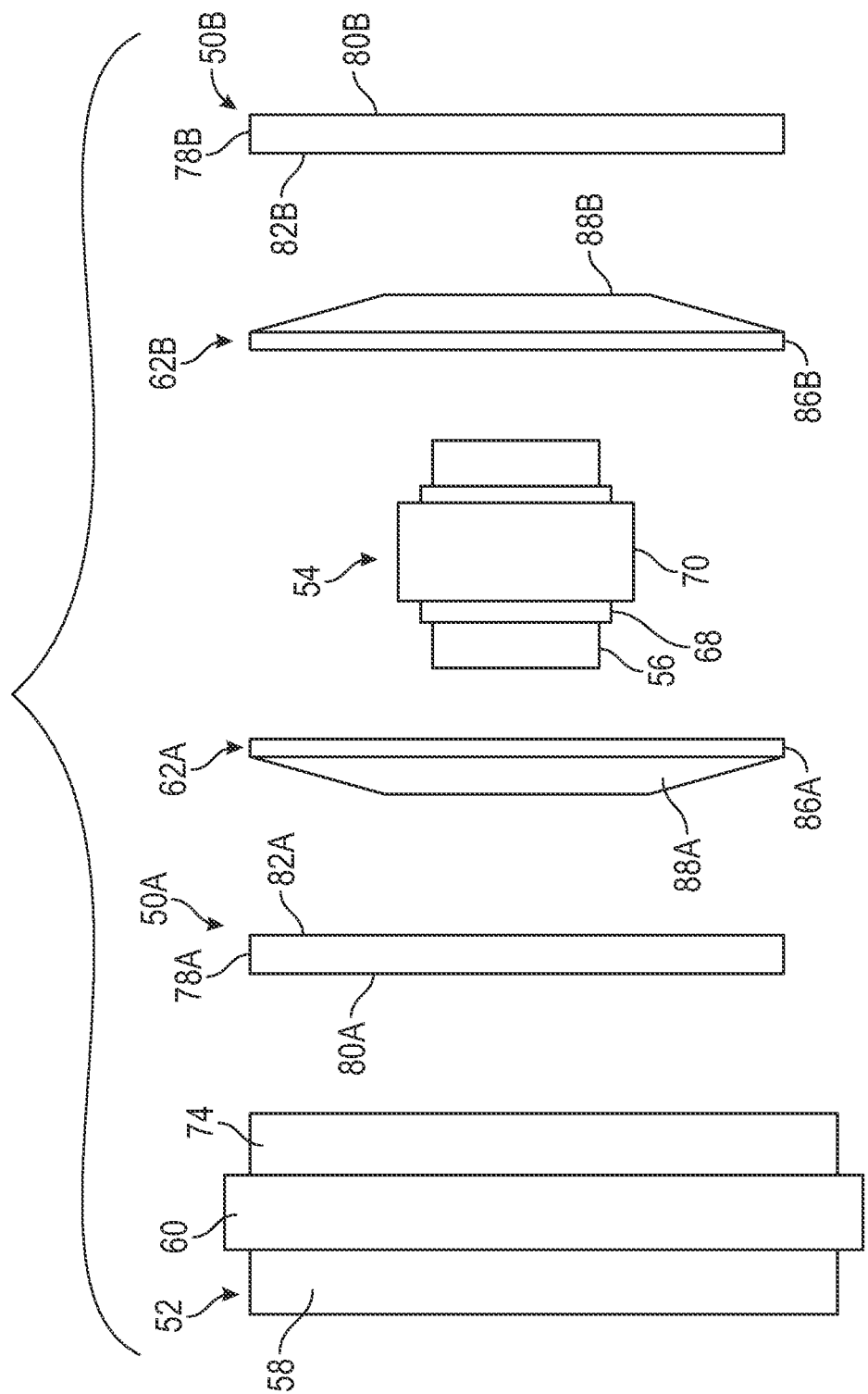
FIG. 5 is an exploded front view of the idler wheel of FIG. 4.
Figure 6:
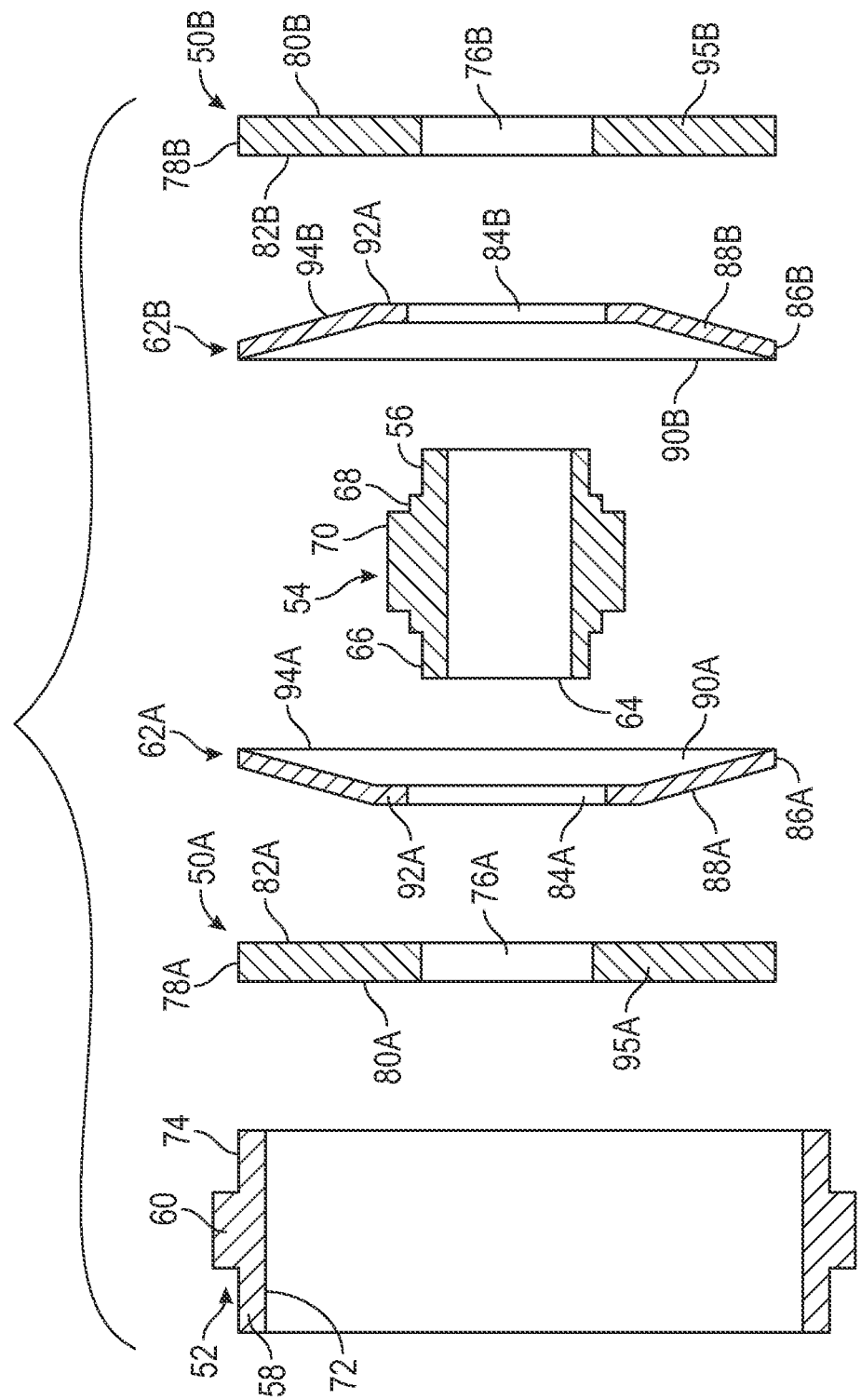
FIG. 6 is an exploded cross-sectional view of the idler wheel of FIG. 5.

FIG. 5 is an exploded front view of idler 28 of FIG. 4. FIG. 6 is an exploded cross-sectional view of idler 28 of FIG. 5. FIGS. 5 and 6 are discussed concurrently.

Sleeve 56 of hub 54 can comprise a cylindrical body extending along center line $C_L$ to define inner diameter surface 64 and outer diameter surface 66. Inner diameter surface 64 can comprise a smooth-bored surface to rotate flush against mating cylindrical component, such as an axle, spindle or pin. Outer diameter surface 66 can include first shoulder 68 and second shoulder 70. Shoulders 68 and 70 can be centered on sleeve 56. First shoulder 68 can extend across less than the entirety of sleeve 56. Second shoulder 70 can extend across less than the entirety of first shoulder 68. In an embodiment, shoulder 68 can have a thickness approximately half of the thickness of sleeve 56 and shoulder 70 can have a thickness approximately equal the thickness of sleeve 56. Sleeve 56, first shoulder 68 and second shoulder 70 all comprise features of a single-piece or monolithic piece of material forming hub 54. However, in other embodiments, sleeve 56, first shoulder 68 and second shoulder 70 can be produced as separate pieces that are joined together.

Ring 58 of tread 52 can comprise a cylindrical body extending along center line $C_L$ to define inner diameter surface 72 and outer diameter surface 74. Inner diameter surface 72 can comprise a smooth-bored surface to mate flush with surfaces of side plates 50A and 50B and idler webs 62A and 62B. Flange 60 can extend from outer diameter surface 74. Flange 60 can extend across less than the entirety of ring 58 and can be centered on ring 58. In an embodiment, flange 60 can be thicker than ring 58. Flange 60 can be configured to ride between running surfaces of track components, such as links 40 if FIG. 1. Ring 58 and flange 60 both comprise features of a single-piece or monolithic piece of material forming tread 52. However, in other embodiments, ring 58 and flange 60 can be produced as separate pieces that are joined together.

First side plate 50A can comprise first bore 76A, first rim 78A, first outer side wall 80A and first inner side wall 82A. Second side plate 50B can comprise second bore 76B, second rim 78B, second outer side wall 80B and second inner side wall 82B. Rims 78A and 78B can be smooth, cylindrical surfaces to facilitate engagement with inner diameter surface 72 of ring 58 of tread 52. Bores 76A and 76B can be smooth, cylindrical surfaces to facilitate engagement with sleeve 56 of hub 54. Side plates 50A and 50B can each comprise a single-piece or monolithic piece of material.

First idler web 62A can comprise first bore 84A, first rim 86A, first convex side wall 88A and first concave side wall 90A. Second idler web 62B can comprise second bore 84B, second rim 86B, second convex side wall 88B and second concave side wall 90B. Idler web 62A can include curvature to form radial rim section 92A and oblique web section 94A. Idler web 62B can include curvature to form radial rim section 92B and oblique web section 94B. Rims 86A and 86B can be smooth, cylindrical surfaces to facilitate engagement with inner diameter surface 72 of ring 58 of tread 52. Bores 84A and 84B can be smooth, cylindrical surfaces to facilitate engagement with first shoulder 68 of hub 54. Idler webs 62A and 62B can each comprise a single-piece or monolithic piece of material. However, in other embodiments, radial rim sections 92A and 92B and oblique web sections 94A and 94B can be produced as separate pieces, respectively, that are joined together.

Figure 7:
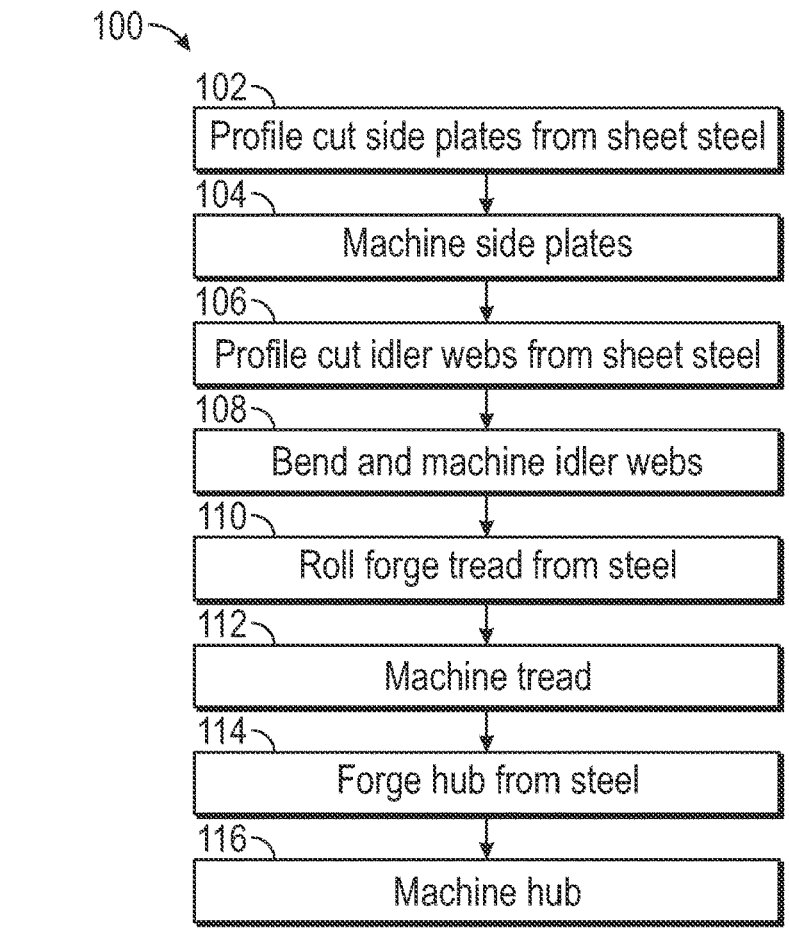
FIG. 7 is a line diagram illustrating a method for manufacturing components of an idler wheel of the present disclosure.

FIG. 7 is a line diagram illustrating method 100 for manufacturing components of idler 28 of the present disclosure. Method 100 describes an example set of steps for producing each of the components of idler 28, such as tread 52, hub 54, side plates 50A and 50B and webs 62A and 62B. However, in other examples, other means of production can be used. Additionally, method 100 outlines an example sequence of steps for producing the components of idler 28. However, in other examples, other sequences of steps can be used.

Figure 9:
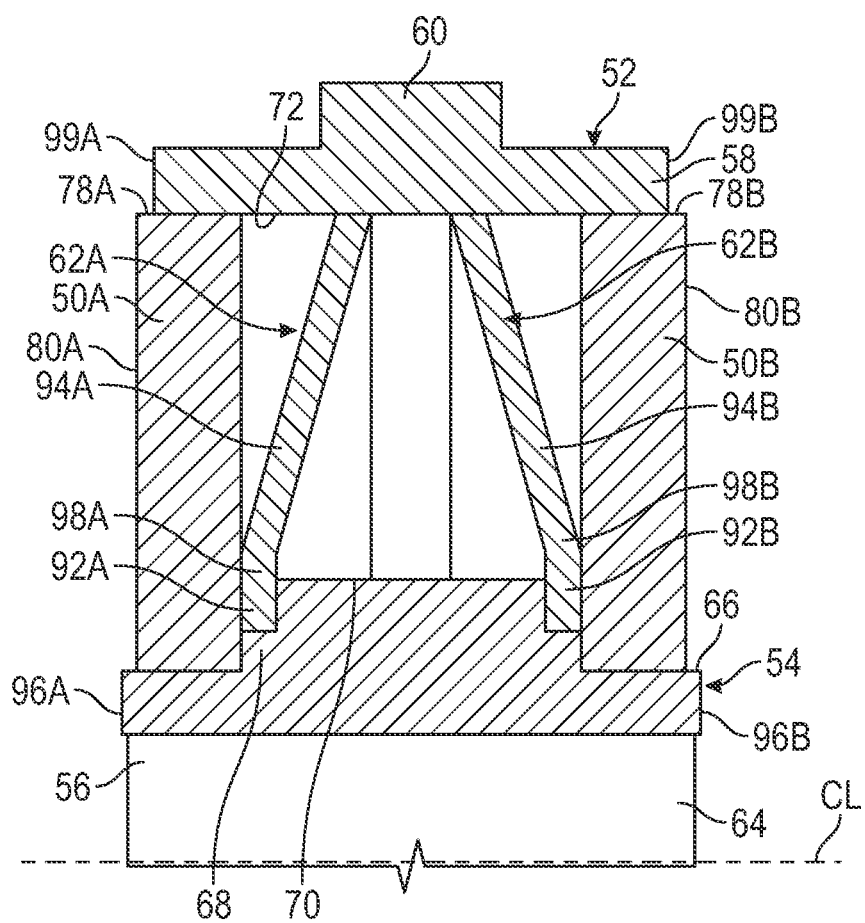
FIG. 9 is a close-up cross-sectional view of idler webs and side plates attached to a tread and a hub.

At step 102, side plates 50A and 50B can each be cut from a blank sheet of material. In an example, a machine, such as a profile cutting machine or die cutting machine can cut the shape of side plates 50A and 50B. For example, the cutting machine can include a cutting instrument having the profile of side plates 50A and 50B formed by rims 78A and 78B and bores 76A and 76B. Side plates 50A and 50B can be formed of round disk-shaped bodies 95A and 95B have rectangular cross-sectional profiles in a radially extending plane from centerline $C_L$, as shown in FIGS. 3 and 9.

Side plates 50A and 50B can be produced from stock sheet material that is widely available such that production of side plates 50A and 50B can be carried out at production facilities without the need for special or customized processing equipment. In an example, side plates 50A and 50B can be produced from steel or steel alloys. However, other materials can be used.

At step 104, side plates 50A and 50B can be machined to include additional features. For example, if not produced at step 102, bores 76A and 76B can be machined into side plates 50A and 50B, respectively, using any suitable means, such as a drilling or milling machine. Additionally, the surfaces of bores 76A and 76B and rims 78A and 78B can be finished, such as polished, peened or ground to, for example, facilitate joining with surfaces of hub 54 and tread 52, respectively.

At step 106, idler webs 62A and 62B can each be cut from a blank sheet of material. In an example, a machine, such as a profile cutting machine or die cutting machine can cut the shape of idler webs 62A and 62B. For example, the cutting machine can include a cutting instrument having the profile of idler webs 62A and 62B formed by rims 86A and 86B and bores 84A and 84B.

At step 108, idler webs 62A and 62B can be machined to include additional features. For example, if not produced at step 106, bores 84A and 84B can be machined into idler webs 62A and 62B, respectively, using any suitable means, such as a drilling or milling machine. Additionally, the surfaces of bores 84A and 84B and rims 86A and 86B can be finished, such as polished, peened or ground to, for example, facilitate joining with surfaces of hub 54 and tread 52, respectively. Likewise, idler webs 62A and 62B can be worked, such as by using a press, to form bends between rims 78A and 78B and bores 76A and 76B, respectively, to produce rim section 92A and 92B and web sections 94A and 94B, respectively. However, in other embodiments, rim sections 92A and 92B can be produced separately from web sections 94A and 94B and attached together using a welding process, for example, to eliminate the bending step.

Idler webs 62A and 62B can be produced from stock sheet material that is widely available such that production of side plates 50A and 50B can be carried out at production facilities without the need for special or customized processing equipment. In an example, idler webs 62A and 62B can be produced from steel or steel alloys. However, other materials can be used.

At step 110, tread 52 can be produced. Tread 52 can be produced via forging, such as by a roll forging method. Tread 52 can be forged to simultaneously produce both ring 58 and flange 60. Ring 58 and flange 60 can have rectangular cross-sectional profiles in a radially extending plane from centerline $C_L$, as shown in FIGS. 3 and 9.

At step 112, tread 52 can be machined. For example, flange 60 and ring 58 can be machined to produce smooth and flat surfaces for engagement with track links 40 (FIG. 1). In other examples, ring 58 of tread 52 can be machined to produce flange 60 using any suitable means, such as a milling machine or another subtractive manufacturing machine. However, in other embodiments, ring 58 and flange 60 can be produced as separate components and attached together using a welding process, for example, to eliminate the machining step.

In an example, tread 52 can be produced from steel or steel alloys. However, other materials can be used.

At step 114, hub 54 can be produced. Hub 54 can be produced via forging, such as a roll forging method. Hub 54 can be forged to simultaneously produce sleeve 56, first shoulder 68 and second shoulder 70. Sleeve 56, first shoulder 68 and second shoulder 70 can have rectangular cross-sectional profiles in a radially extending plane from centerline $C_L$, as shown in FIGS. 3 and 9.

At step 116, hub 54 can be machined. For example, sleeve 56, first shoulder 68 and second shoulder 70 can be machined to produce smooth and flat surfaces for engagement with side plates 50A and 50B and idler webs 62A and 62B. In other examples, sleeve 56 of hub 54 can be machined to produce first shoulder 68 and second shoulder 70 using any suitable means, such as a milling machine or another subtractive manufacturing machine. However, in other embodiments, sleeve 56, first shoulder 68 and second shoulder 70 can be produced as separate components and attached together using a welding process, for example, to eliminate the machining step.

In an example, hub 54 can be produced from steel or steel alloys. However, other materials can be used.

Because idler 28 is fabricated from a plurality of different components, the materials for forming and processes for shaping each of the components of idler 28 can be optimized for better performance. Conventionally, with single-piece forged or case idlers, the entire component is made from a single material. For example, the material for conventionally forged or cast, single-piece idlers was typically selected to reduce or minimize porosity of the component, with other considerations such as hardness and strength having to be accommodated in view of porosity. However, idler 28 of the present disclosure can have, for example, tread 52 and hub 54 made from different materials. For example, tread 52 can be made from a material to better resist wear from rolling against the track system, such as a carbide material, while side plates 50A and 50B can be made of stronger, less expensive material, such as a steel alloy. Likewise, idler webs 62A and 62B can be made of less hard and more resilient materials as compared to tread 52 and hub 54 to, for example, better absorb side-to-side loading without breaking.

Figure 8:
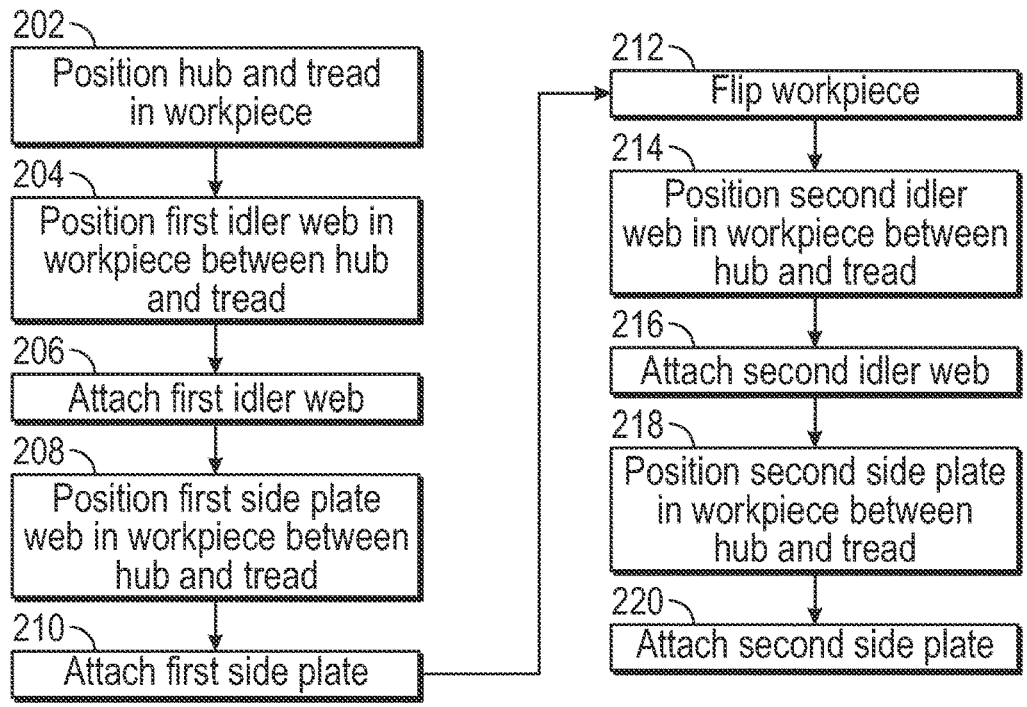
FIG. 8 is a line diagram illustrating a method for assembling components of an idler wheel of the present disclosure.

FIG. 8 is a line diagram illustrating method 200 for assembling components of idler 28 of the present disclosure. In an embodiment, one side of idler 28 can be built-up first before the other side of idler 28 is build-up. For example, first idler web 62A can be attached to hub 54 and tread 52, then first side plate 50A can be attached to hub 54 and tread 52, then partially-assembled idler 28 can be flipped over, then second idler web 62B can be attached to hub 54 and tread 52, and then finally second side plate 50B can be attached to hub 54 and tread 52, as is described with reference to steps 202-220. However, in other examples, both of idler webs 62A and 62B can first be attached to hub 54, followed by attachment of both of side plates 50A and 50B.

At step 202, hub 54 and tread 52 can be placed in a workpiece, such as a fixture for securing hub 54 and tread 52 in a fixed manner for facilitating further operations, such as welding. Hub 54 and tread 52 can be positioned such that a first side of each of hub 54 and tread 52 are exposed. The workpiece can hold hub 54 and tread 52 at a fixed distance apart and in a concentric manner relative to centerline $C_L$ such that the other components of idler 28 can fit therebetween in an aligned manner. For example, outer diameter surface 66 of hub 54 and inner diameter surface 72 of tread 52 can be disposed parallel to centerline $C_L$ so that surfaces of bores 76A and 76B and rims 78A and 78B of side plates 50A and 50B fit between hub 54 and tread 52 in a parallel manner.

At step 204, first idler web 62A can be inserted into position between hub 54 and tread 52. Bore 84A can be positioned over first shoulder 68 to engage second shoulder 70. The diameter of bore 84A can be sized so that idler web 62A mates with the outer diameter surface of first shoulder 68. In an example, an interference fit between bore 84A and first shoulder 68 can be provided. Once positioned over first shoulder 68, idler web 62A can be slid across first shoulder 68 to engage the side of second shoulder 70.

Simultaneously, idler web 62A can be positioned within tread 52. The outer diameter of rim 86A can be sized to fit against inner diameter surface 72 of tread 52. Idler web 62A can be positioned such that tread 52 will eventually be centered on idler webs 62A and 62B, collectively. In such a position, idler webs 62A and 62B will be positioned radially inward of flange 60.

At step 206, first idler web 62A can be secured in place between tread 52 and hub 54, such as by a metallurgical method like welding. However, in other embodiments, other methods can be used, such as brazing or threaded engagement. Welds can be positioned on hub 54 between radial rim portion 92A and first shoulder 68. Welds can be positioned on tread 52 between oblique web portion 94A and ring 58.

At step 208, first side plate 50A can be attached to hub 54 and tread 52. Bore 76A can be positioned over outer diameter surface 66 to engage first shoulder 68. The diameter of bore 76A can be sized so that side plate 50A mates with outer diameter surface 66 of sleeve 56. In an example, an interference fit between bore 76A and outer diameter surface 66 can be provided. Once positioned over sleeve 56, side plate 50A can be slid across outer diameter surface 66 to engage convex side wall 88A of idler web 62A. Simultaneously, rim 78A of side plate 50A can be slid against inner diameter surface 72 of tread 52.

Side plate 50A can be positioned such that sleeve 56 of hub 54 extends beyond outer side wall 80A. Side plate 50A can be positioned such that tread 52 will eventually be centered on side plates 50A and 50B, collectively. In such a position, side plate 50A will extend beyond ring 58.

At step 210, side plate 50A can be secured in place, such as by using a metallurgical method like welding. However, in other embodiments, other methods can be used, such as brazing or threaded engagement. Welds can be positioned on hub 54 between side plate 50A and sleeve 56. Welds can be positioned on tread 52 between side plate 50A and ring 58.

At step 212, the workpiece holding hub 54 and tread 52 can be flipped or rotated one-hundred-eighty degrees to facilitate assembly and welding of the other, second side of hub 54 and tread 52. In other examples, partially-assembled idler 28 can be removed from the workpiece and flipped to expose the other side of hub 54 and tread 52 before being repositioned back into the workpiece.

At step 214, second idler web 62BA can be inserted into position between hub 54 and tread 52. Bore 84B can be positioned over first shoulder 68 to engage second shoulder 70. The diameter of bore 84B can be sized so that idler web 62B mates with the outer diameter surface of first shoulder 68. In an example, an interference fit between bore 84B and first shoulder 68 can be provided. Once positioned over first shoulder 68, idler web 62B can be slid across first shoulder 68 to engage the side of second shoulder 70.

Simultaneously, idler web 62B can be positioned within tread 52. The outer diameter of rim 86B can be sized to fit against inner diameter surface 72 of tread 52. Idler web 62B can be positioned such that tread 52 will eventually be centered on idler webs 62A and 62B, collectively. In such a position, idler webs 62A and 62B will be positioned radially inward of flange 60.

At step 216, second idler web 62B can be secured in place between tread 52 and hub 54, such as by a metallurgical method like welding. However, in other embodiments, other methods can be used, such as brazing or threaded engagement. Welds can be positioned on hub 54 between radial rim portion 92B and first shoulder 68. Welds can be positioned on tread 52 between oblique web portion 94B and ring 58.

At step 218, second side plate 50B can be attached to hub 54 and tread 52. Bore 76B can be positioned over outer diameter surface 66 to engage first shoulder 68. The diameter of bore 76B can be sized so that side plate 50B mates with outer diameter surface 66 of sleeve 56. In an example, an interference fit between bore 76B and outer diameter surface 66 can be provided. Once positioned over sleeve 56, side plate 50B can be slid across outer diameter surface 66 to engage convex side wall 88B of idler web 62B. Simultaneously, rim 78B of side plate 50B can be slid against inner diameter surface 72 of tread 52.

Side plate 50B can be positioned such that sleeve 56 of hub 54 extends beyond outer side wall 80B. Side plate 50B can be positioned such that tread 52 will eventually be centered on side plates 50A and 50B, collectively. In such a position, side plate 50B will extend beyond ring 58.

At step 220, side plate 50B can be secured in place, such as by using a metallurgical method like welding. However, in other embodiments, other methods can be used, such as brazing or threaded engagement. Welds can be positioned on hub 54 between side plate 50B and sleeve 56. Welds can be positioned on tread 52 between side plate 50B and ring 58.

FIG. 9 is a close-up cross-sectional view of idler webs 62A and 62B and side plates 50A and 50B attached to tread 52 and hub 54 to form idler 28.

Radial rim sections 92A and 92B of idler webs 62A and 62B can be positioned on first shoulder 68 to engage laterally with second shoulder 70. Side plates 50A and 50B can be pushed laterally against radial rim sections 92A and 92B. As such, radial rim sections 92A and 92B can be sandwiched or axially bound by second shoulder 70 and side plates 50A and 50B to support and stabilize the radial inner ends of idler webs 62A and 62B.

Oblique web sections 94A and 94B of idler webs 62A and 62B can angle inward from rim sections 92A and 92B, respectively, to engage with inner diameter surface 72 of tread 52. Oblique web sections 94A and 94B can be positioned to be axially inward of the axial extent of flange 60. As such, idler webs 62A and 62B can support the axial interior of tread 52, such as where flange 60 will be pushing against ring 58 during engagement with track links. Bend portions 98A and 98B of idler webs 62A and 62B can facilitate angling of oblique web sections 94A and 94B. Angling of oblique web sections 94A and 94B can facilitate idler 28 resisting bending in the axial direction.

Side plates 50A and 50B can be positioned within the axial extent of sleeve 56 defined by end surfaces 96A and 96B to avoid producing stress concentrations at end surfaces 96A and 96B of sleeve 56. As such, a small segment of outer diameter surface 66 can be left exposed at each end of sleeve 56. Such segments additionally provide surface area for the placement of welds.

Tread 52 can be positioned outward of side plates 50A and 50B on rims 78A and 78B. Ring 58 of tread 52 is shorter in axial length than the distance between outer side walls 80A and 80B such that small segments of the surfaces of rims 78A and 78B are left exposed, which can provide surface area for the placement of welds. Thus, the axial length of first shoulder 68 can be sized to space side plates 50A and 50B to locate end surfaces 99A and 99B of ring 58 between outer side walls 80A and 80B.

INDUSTRIAL APPLICABILITY

The present disclosure describes various systems, assemblies, devices and methods for constructing idler wheel assemblies that can be used in track systems of tracked vehicles. The idler wheels and associated methods described herein can provide strong, light-weight and easy-to-manufacture idler wheels as compared to previous idlers that are heavy, single-material, and difficult to produce. As discussed, previous idler wheel designs for large construction equipment involve casting or forging very large and very heavy, single-piece components in order to produce idler wheels strong enough to meet performance demands. The casting or forging and subsequent heat treatment processes are not widely available, making manufacturing and distribution of such idler wheels difficult. Furthermore, the casting and forging processes typically result in idler wheels made from a single material for which the primary selection criteria is porosity. Thus, other material properties that may be more desirable to maximize at specific locations within the idler wheel can be overlooked. With the webbed idler wheel designs of the present application, the individual components or pieces of the idler wheel can be made from highly available stock material components to increase the availability of production facilities capable of producing large idler wheels. Also, the individual components or pieces can be made of materials to maximize performance of each component or piece within the idler wheel, thereby making highly customizable idler wheels possible. The webbed fabrications described herein additionally have benefits over other proposed fabricated idlers that can be difficult to produce due to required alignment of pieces, and that are typically not strong enough for use in large machines, such as in mining excavators, particularly at the tread flange. As such, webbed idler designs can be provided to support the tread flange, either in single, double or other multi-webbed designs.

What is claimed is:

1. An idler wheel for a tracked machine, the idler wheel comprising:
   a cylindrical hub defining a central axis;
   an annular tread disposed concentrically about the cylindrical hub;
   a pair of side plates connecting the cylindrical hub and the annular tread, wherein the pair of side plates are located radially between and radially connect the cylindrical hub and the annular tread; and
   a webbing connecting the cylindrical hub and the annular tread between the pair of side plates;
   wherein the webbing comprises a pair of webs comprising first and second webs, the first and second webs each comprising:
      a radially extending rim portion; and
      a web portion extending outwardly from the rim portion at an oblique angle to the central axis;
      wherein the web portions are flared axially outward in a direction extending from the annular tread to the cylindrical hub.

2. The idler wheel of claim 1, wherein the pair of side plates comprises first and second side plates, the first and second side plates each comprising:
   a round disk-shaped body; and
   a hub bore located at a center of the disk-shaped body;
   wherein an outer diameter end of the round disk-shaped body engages a radially inner surface of the annular tread.

3. The idler wheel of claim 2, wherein an inner diameter of the round disk-shaped body engages a radially outer surface of the cylindrical hub.

4. The idler wheel of claim 1, wherein the cylindrical hub comprises:
   a sleeve portion extending into the pair of side plates; and
   a first shoulder radially extending from the sleeve portion between the pair of side plates, the pair of webs radially extending from the first shoulder.

5. The idler wheel of claim 4, wherein the cylindrical hub further comprises:
   a second shoulder radially extending from the first shoulder, the pair of webs being axially positioned between the second shoulder and the pair of side plates.

6. The idler wheel of claim 5, wherein the pair of side plates, the pair of webs and the second shoulder contiguously contact each other in a direction of the central axis.

7. The idler wheel of claim 1, wherein:
   the annular tread further comprises a guide flange extending radially therefrom; and
   the webbing connects to the annular tread radially aligned with the guide flange.

8. The idler wheel of claim 7, wherein the webbing comprises a pair of webs that are axially spaced from each other at the annular tread.

9. The idler wheel of claim 8, wherein the guide flange is narrower than a distance between the pair of webs at the cylindrical hub.

10. The idler wheel of claim 1, wherein:
    the cylindrical hub has a first axial width;
    the pair of side plates define a second axial width less than the first axial width; and
    the annular tread has a third axial width less than the second axial width.

11. A double-webbed idler wheel for a vehicle track system, the double-webbed idler wheel comprising:
    an inner diameter hub comprising:
       first axially spaced apart side faces defining a first axial width; and
       a first shoulder extending radially outward from between the first axially spaced apart side faces;
    an outer diameter tread concentrically disposed about the inner diameter hub, the outer diameter tread comprising:
       second axially spaced apart side faces defining a second axial width; and
       a guide flange extending radially outward from between the second axially spaced apart side faces;
    a first pair of webs extending from the inner diameter hub to the outer diameter tread; and
    a second pair of webs extending from the inner diameter hub radially aligned with the first shoulder to the outer diameter tread radially aligned with the guide flange.

12. The double-web idler wheel of claim 11, further comprising a second shoulder extending from the first shoulder, wherein the first pair of webs extend from adjacent the second shoulder to the guide flange at an oblique angle to a central axis of the double-webbed idler.

13. An idler wheel for a tracked machine, the idler wheel comprising:
    a cylindrical huh defining a central axis, the cylindrical huh comprising:
       a sleeve portion;
       a first shoulder radially extending from the sleeve portion; and
       a second shoulder radially extending from the first shoulder;
    an annular tread disposed concentrically about the cylindrical hub;
    a pair of side plates connecting the cylindrical hub and the annular tread; and
    a webbing connecting the cylindrical hub and the annular tread between the pair of side plates, the webbing comprising:
       a pair of webs comprising first and second webs, the first and second webs each comprising:
          a radially extending rim portion; and
          a web portion extending outwardly from the rim portion at an oblique angle to the central axis;
    wherein the sleeve portion extends into the pair of side plates;
    wherein the first shoulder is positioned between the pair of side plates;
    wherein the pair of webs radially extend from the first shoulder;

the pair of webs being axially positioned between the second shoulder and the pair of side plates; and wherein the pair of side plates, the pair of webs and the second shoulder contiguously contact each other in a direction of the central axis.

14. An idler wheel for a tracked machine, the idler wheel comprising:

a cylindrical hub defining a central axis;

an annular tread disposed concentrically about the cylindrical hub, the annular tread further comprising a guide flange extending radially therefrom;

a pair of side plates connecting the cylindrical hub and the annular tread, wherein the pair of side plates are located radially between and radially connect the cylindrical hub and the annular tread; and a webbing connecting the cylindrical hub and the annular tread between the pair of side plates, wherein:

the webbing connects to the annular tread radially aligned with the guide flange; and the webbing comprising a pair of webs that are axially spaced from each other at the annular tread.

\* \* \* \* \*